3,047,360
PROCESS FOR EXTRACTING NEPTUNIUM AND PLUTONIUM FROM NITRIC ACID SOLUTIONS OF SAME CONTAINING URANYL NITRATE WITH A TERTIARY AMINE

John C. Sheppard, San Diego, Calif., assignor to the United States of America as represented by the United States Atomic Energy Commission
No Drawing. Filed July 15, 1958, Ser. No. 748,769
1 Claim. (Cl. 23—14.5)

This invention deals with a process of extracting neptunium and/or plutonium values from aqueous solutions, and in particular with the separation of said values from uranium and/or fission product values contained in aqueous mineral acid solutions.

The process of this invention is applicable, for instance, to waste solutions as they are obtained in the solvent extraction of uranium from so-called dissolver solutions which are solutions obtained by dissolving neutron-irradiated uranium in nitric acid and which contain plutonium as well as neptunium and fission products. The process is also useful in the recovery of plutonium and/or neptunium from fuel elements of a plutonium-aluminum alloy or rather the solutions obtained by dissolving these fuel elements in nitric acid. Another application is the extraction of plutonium and neptunium from an untreated dissolver solution in which the uranyl nitrate concentration is up to about 1 M.

It is an object of this invention to provide a process for the extraction of neptunium and/or plutonium values from aqueous radioactive solutions with a substantially water-immiscible solvent the efficiency of which is not impaired by radioactivity.

It is another object of this invention to provide a process of extracting plutonium and/or neptunium values from aqueous solutions containing said values together with fission product values whereby a good separation of said plutonium and/or neptunium values from said fission product and/or uranium values is obtained.

The objects of this invention are accomplished by contacting a mineral acid solution containing neptunium and/or plutonium values with a substantially water-immiscible tertiary amine whereby said values are taken up by said amine, and separating an organic extract phase from an aqueous raffinate.

The amines, in order to be suitable for the process of this invention, have to be water-immiscible, they have to be stable to radiation, and, in the case of uranium and fission product-containing solutions, they also should not extract the uranium and these fission products to a substantial degree. Amines found satisfactory are tri-n-hexylamine, tri-n-heptylamine, tri-n-octylamine, tri-isooctylamine and tri-laurylamine. The amines usually have a rather high viscosity which makes phase separation difficult. In order to overcome this disadvantage, the amines are preferably diluted by dissolution in an organic low-viscosity solvent.

The preferred amine is trilaurylamine; one of its advantages is that, when used in diluted form, a second organic phase during contact with the acid aqueous solution is not obtained as is the case with some of the other amines. Furthermore back-extraction of the plutonium values is easier from trilaurylamine than from the other amines. Trilaurylamine is commercially available and comparatively inexpensive. However, the other amines listed above yielded also highly satisfactory results.

When there are two organic phases, they usually coalesce into one organic phase during the back-extraction or stripping step; also, heating of the solution to about 90° C. was found to bring about coalescence. A means of preventing the formation of two phases is the addition of n-octyl alcohol; it is effective in as low a content as about 1½ volume percent and preferably ranges up to 5% by volume.

Organic solvents that are suitable as diluents for the amines are kerosene, xylene, petroleum hydrocarbon mixtures of a suitably low viscosity, nitromethane, carbon tetrachloride, orthodichlorobenzene and ethylenedibromide. A concentration of from 2 to 10% of the amine in the diluents was found to be the preferred range. (In this specification all amine concentrations in the diluent are given as percent by volume.) A mixture which proved especially satisfactory was that containing 10% of trilaurylamine, 2% of n-octyl alcohol and 88% of a petroleum hydrocarbon mixture.

The amine concentration has an effect on decontamination from fission products. In a series of tests in which the tri-n-octylamine concentrations in xylene varied from 1 to 10% the separation factors of plutonium from zirconium, niobium and cerium contained together in the solution increased by factors of from 5 to 10 with increasing amine concentration. Amine concentrations higher than 10% yielded better decontamination yet, but phase separation then was rather difficult. Therefore a concentration of about 10% was considered to be the most desirable concentration.

The effect of the amine concentration on the extraction of plutonium is shown in Example I.

EXAMPLE I

A series of experiments were carried out in which tri-n-octylamine in xylene was used as the extractant with different concentrations varying within the range of from 0.1 to 100 volume percent. The extractant was pre-equilibrated with 2 M nitric acid solution prior to use. Extraction was made in each case from a solution containing plutonium nitrate $Pu(NO_3)_4$, nitric acid in a concentration of 2 M and sodium nitrite in a concentration of 0.03 M as a so-called holding agent to maintain the plutonium in the tetravalent state. Plutonium was first extracted into the organic solvent and then back-extracted from the organic phase with a 0.03 M solution of ferrous sulfamate. The extraction coefficients (organic:aqueous) exhibited an approximate second power dependence on the amine concentration; they ranged from 0.1 for an amine concentration of 0.1% to 2670 for the undiluted tri-n-octylamine.

The dependence of the extraction of neptunium (IV) on the tri-n-octylamine concentration is illustrated in Example II.

EXAMPLE II

Various fractions of a solution containing $Np(NO_3)_4$ in tracer concentration, nitric acid in a concentration of 8 M and 0.01 M ferrous sulfamate as a holding agent were contacted each with a solution of tri-n-octylamine in xylene of a different concentration and in one instance with the undiluted amine. The distribution coefficients (organic:aqueous) are compiled in Table I.

*Table I*

| Percent tri-n-octylamine in xylene | Np distribution coefficient |
|---|---|
| 0.5 | 0.14 |
| 1.0 | 0.58 |
| 2.0 | 2.30 |
| 3.0 | 5.10 |
| 5.0 | 11.8 |
| 8.0 | 30 |
| 10.0 | 37 |
| 20.0 | 106 |
| 50.0 | 284 |
| 100 | 720 |

The ratio of extractant (amine solution) to aqueous solution may vary widely and preferably ranges between 1:10 and 10:1.

The acidity of the solution has some effect on the degree of extraction. In the case of neptunium and nitric acid solution, the extraction increases with increasing acidity up to a concentration of about 6 M and then decreases again. The dependence of neptunium extraction on nitric acid content of the solution is shown in Example III.

EXAMPLE III

An aqueous solution of neptunium (IV) nitrate containing 0.01 M ferrous sulfamate as a holding reducing agent was contacted with a 10% solution of tri-n-octylamine in xylene. In each test the nitric acid concentration of the aqueous solution differed. The results are summarized in Table II.

*Table II*

| $HNO_3$, M | Distribution Coefficient (organic:aqueous) of Np (IV) |
|---|---|
| 2 | 45 |
| 4 | 66 |
| 5 | 60 |
| 6 | 58 |
| 7 | 55 |
| 8 | 37 |
| 9 | 28 |
| 10 | 14 |

These data show that with a nitric acid concentration of between 4 and 6 M optimal neptunium extraction is obtained.

The neptunium extraction, however, is not dependent on acidity but rather on the concentration of nitric acid anions. This is shown in Example IV.

EXAMPLE IV

Experiments were carried out with aqueous solutions all having a total nitrate anion concentration of 6 M but having different ratios of nitric acid and sodium nitrate. A solution of 10% tri-n-octylamine in xylene was used as the extractant. The results of these experiments are compiled in Table III.

*Table III*

| $HNO_3$, M | $NaNO_3$, M | Distribution Coefficient (organic:aqueous) of Np (IV) |
|---|---|---|
| 1.0 | 5.0 | 130 |
| 2.0 | 4.0 | 69 |
| 3.0 | 3.0 | 69 |
| 4.0 | 2.0 | 55 |
| 5.0 | 1.0 | 69 |
| 6.0 | 0 | 55 |

With the exception of the run made with a nitric acid concentration of 1 M, which yielded a radically higher extraction than the others, the neptunium extraction showed no substantial change with different acidities. Therefore the concentration of nitrate anions, rather than acidity, must be the important factor.

The extraction of tetravalent plutonium from aqueous solutions of varying nitric acid concentrations is illustrated in Example V.

EXAMPLE V

The plutonium (IV) nitrate solutions to be extracted contained nitrous acid in a concentration of 0.03 M as a holding agent. A 10% solution of tri-n-octylamine in xylene was the extractant. The extraction coefficients are given in Table IV.

*Table IV*

| $HNO_3$, M | Distribution Coefficient (organic:aqueous) of Pu (IV) |
|---|---|
| 2 | 90 |
| 4 | 82 |
| 6 | 72 |
| 8 | 50 |

It is obvious from these data that lower nitric acid concentrations yield a better plutonium extraction than the higher ones. In other experiments it was established that the best suitable acidity for plutonium extraction is between 1 and 2 M.

When plutonium is to be separated from an aqueous solution derived from neutron-irradiated uranium and containing fission products, the nitric acid concentration is advantageously maintained at a high value because the coextraction of ruthenium, it was found, is then at a minimum. The separation factor for plutonium (IV) from ruthenium from a nitric acid solution using a 10% solution of tri-n-octylamine in xylene as the extractant increased from $1.5 \times 10^3$ at a nitric acid concentration of 1 M to $2.9 \times 10^4$ at a nitric acid concentration of 8 M. The separation of plutonium from other fission products, such as zirconium, niobium and cerium, is little or not dependent on the acidity.

The situation was somewhat different when, instead of a nitric acid solution, a hydrochloric acid solution was used. This is shown in Example VI.

EXAMPLE VI

As in the previous example, a 10% solution of tri-n-octylamine in xylene was used as the extractant. The solutions to be treated were neptunium (IV) solutions in hydrochloric acid of varying concentrations; all solutions contained ferrous sulfamate as a holding agent in a concentration of 0.01 M. The results are summarized in Table V.

*Table V*

| HCl, M | Distribution Coefficient (organic:aqueous) of Np (IV) |
|---|---|
| 4.0 | 0.04 |
| 6.0 | 9 |
| 8.0 | 300 |
| 10.0 | 700 |

Table V shows that neptunium (IV) can be readily extracted from hydrochloric acid solutions and that a concentration of 10 M HCl yields excellent extraction. For the extraction of plutonium (IV) values from hydrochloric acid solutions, acidities of 6 M or above are satisfactory.

While all the experiments described in the examples were made by a batch process, namely, by contacting and shaking the aqueous solution with the amine solution, mostly for about five minutes, the process of this invention can also be carried out in a continuous manner, for instance, by using extraction columns, as is known to those skilled in the art.

The process of this invention can be carried out at room temperature; however, raising the temperature to about 55° C. was found advantageous, because then a better separation from zirconium, niobium and cerium was obtained; for instance, the separation factor of cerium was increased by a factor of 16 when the temperature was raised from 25° to 55° C. For this reason elevated temperature is advisable in the case of extraction from a fission product-containing solution. The separation from ruthenium is very slightly decreased by an increase in temperature.

Extraction was also carried out from solutions containing neptunium or plutonium in valences other than the tetravalent state and also from a thorium nitrate solution. Neptunium (VI) present in a nitric acid solution, when contacted with tri-n-octylamine in xylene, was taken up to a comparatively small degree, the extraction coefficients increasing from 1.9 for a nitric acid concentration of 2 M to 5.2 for a nitric acid concentration of 8 M. Pentavalent neptunium was found to be practically non-extractable, the distribution coefficients being 0.015 and 0.076 for acidities of 4 M and 8 M, respectively. Trivalent plutonium also showed very little affinity for the tri-n-octylamine solution in xylene, the coefficients ranging from 0.04 for 2 M $HNO_3$ to 0.36 for 8 M $HNO_3$. Hexavalent plutonium extracted with a distribution coefficient of 1.8 for 2 M nitric acid and of 4.7 for 8 M nitric acid. Thorium showed an extraction coefficient of 0.064 for 2 M nitric acid and an extraction coefficient of 0.78 for 8 M nitric acid. All these runs were made with 10% tri-n-octylamine in xylene.

The next example will show the recovery of plutonium from solutions containing uranium with and without fission products, respectively.

EXAMPLE VII

An aqueous solution containing uranyl nitrate in a concentration of 1 M, nitric acid in a concentration of 4 M, tracer concentration of tetravalent plutonium and nitrous acid in a concentration of 0.03 M was used. The solution was shaken with an equal volume of a 10% solution of tri-n-octylamine in xylene; the distribution coefficient (organic:aqueous) was 14. Uranium was not extracted to a substantial degree.

Another run was made with another aliquot of the same solution, but this time after some fission products-containing dissolver solution had been added. The other conditions were the same as in the first run. Both the resulting aqueous raffinate and the organic extract phase were $\gamma$-counted. The results (counts per minute per ml. in the aqueous and the organic phase and the distribution coefficients calculated therefrom) are compiled in Table VI.

|  | $Zr^{95}$—$Nb^{95}$ | $Ru^{106}$—$Rh^{106}$ | $Ce^{144}$—$Pr^{144}$ |
|---|---|---|---|
| c./m./ml. aq | $3.4 \times 10^6$ | $2.2 \times 10^5$ | N.D. |
| c./m./ml. org | $<1.6 \times 10^4$ | N.D. | N.D. |
| Distribution coefficient (organic:aqueous) of Np (IV) | $<5 \times 10^{-3}$ | Small | Small |

The nonextractability of trivalent plutonium into the amines of this invention is utilized for the back-extraction of plutonium from the amine solution as has been shown in Example I. For back-extraction, the plutonium (IV)-containing organic phase is contacted with a solution of ferrous sulfamate whereby the plutonium (IV) is reduced to the trivalent state and taken up by the aqueous solution. This stripping of plutonium is improved, it was found, when an excess of sulfamic acid is present. The distribution coefficient for plutonium (organic:aqueous) after stripping was found to be 0.7 when a solution 0.03 M in ferrous sulfamate and 0.1 M in nitric acid was used, but only $5 \times 10^{-6}$ when the stripping solution contained an excess of sulfamic acid in a concentration of 2 M.

Neptunium can be back-extracted with water in the tetravalent state.

In the following example trilaurylamine with and without n-octyl alcohol and tri-iso-octylamine were used as the extractants.

EXAMPLE VIII

A "dissolver solution" of neutron-irradiated uranium was used for all runs. In one run the extractant contained 10% of trilaurylamine, 5% of n-octyl alcohol and 85% of a petroleum hydrocarbon mixture. A second run was carried out with 10% of trilaurylamine in the hydrocarbon mixture without the n-octyl alcohol. In this latter run a third phase formed on extraction; however, on scrubbing with an aqueous medium 4 M in $HNO_3$ and 0.03 M in $NaNO_2$ the two organic phases coalesced as the uranium was back-extracted. This shows that in a conventional extraction column the process can be carried out without the octyl alcohol, since only one organic and one aqueous phase will leave the column. The over-all decontamination factors $$\left( \frac{\text{amount of fission product in original solution}}{\text{amount of plutonium in original solution}} \right.$$

$$\left. \text{divided by } \frac{\text{amount of fission product in strip solution}}{\text{amount of plutonium in strip solution}} \right)$$

were determined for each run. For the first run using n-octyl alcohol the decontamination factors for cerium, ruthenium and zirconium plus niobium were $>10^5$, $>10^5$ and 500, respectively, while the corresponding decontamination factors in the second run without the n-octyl alcohol were $6 \times 10^5$, $1.5 \times 10^4$ and $10^5$. Similar decontamination factors were obtained with tri-iso-octylamine.

Stripping was found to be easier and better from the trilaurylamine. While for runs with tri-iso-octylamine the plutonium stripping coefficients (organic:aqueous) were 2.2 and 5.7, when a 0.03 M ferrous sulfamate solution was used, those for two corresponding runs with trilaurylamine were 0.004 and 0.0023. When stripping was carried out from tri-iso-octylamine at a temperature of 60° C. instead of at room temperature, plutonium stripping was improved from the tri-iso-octylamine and a stripping coefficient of 0.002 was obtained. The elevated temperature also increased the zirconium-niobium decontamination tenfold.

It is to be understood that this invention is not to be limited to the details given herein, but that it may be modified within the scope of the appended claim.

What is claimed is:

A process of separating plutonium values and neptunium values from uranium values contained in an aqueous nitric acid solution in which uranyl nitrate is present in a maximum concentration of 1 M, comprising adjusting the nitric acid concentration to about 4 M, adding nitrous acid to yield a concentration of about 0.03 M; adding a solution of about 10% of a tertiary amine, said amine being selected from the group consisting of tri-n-hexylamine, tri-n-heptylamine, tri-n-octylamine, tri-iso-octylamine and trilaurylamine, in a substantially water-immiscible organic diluent whereby the neptunium and plutonium values are taken up by an organic extract phase while the uranium values remain in an aqueous raffinate; and separating said organic extract phase from the aqueous raffinate.

References Cited in the file of this patent
UNITED STATES PATENTS

| 2,227,833 | Hixson | Jan. 7, 1941 |
| 2,833,616 | Voiland | May 6, 1958 |
| 2,847,276 | Butler | Aug. 12, 1958 |
| 2,849,277 | Thomas | Aug. 26, 1958 |
| 2,877,250 | Brown | Mar. 10, 1959 |

OTHER REFERENCES

ORNL–1859, pages 1–29, Feb. 1, 1955, declassified Jan. 22, 1958.

TID–7508, pages 54–55, Apr. 1, 1955.

Peaceful Uses of Atomic Energy, vol. 9, pages 492–497, 571, Aug. 8–20, 1955.

ORNL–2297, pages 1, 5–14, 18, 19, May 27, 1957.

Moore: AEC Document CF–57–6–61, 21 pages, June 18, 1957; abstracted in Nuclear Science Abstracts, Feb. 15, 1958, page 261, Item 2266. Also available in Analytical Chem., vol. 30, pp. 908–911 (1958, May).

Sheppard: AEC Document HW–51958, 13 pages, Aug. 22, 1957, declassified Oct. 23, 1957; abstracted in Nuclear Science Abstracts, Feb. 15, 1958, page 261, Item 2267.

ORNL–2388, pages 3–8, 13, 14, Jan. 9, 1958.